United States Patent [15] 3,665,086
Magee et al. [45] May 23, 1972

[54] LORAN TRAINER

[72] Inventors: Edward F. Magee, Crofton; Stephen G. Haube, Laurel, both of Md.

[73] Assignee: The Singer Company, New York, N.Y.

[22] Filed: Aug. 20, 1969

[21] Appl. No.: 851,574

[52] U.S. Cl. ............................35/10.2, 343/103, 235/150.27
[51] Int. Cl. ..........................................G01s 1/24, G09b 9/00
[58] Field of Search ............235/150.27, 150.271, 150.272, 235/151.3; 343/103; 35/10.2

[56] References Cited

UNITED STATES PATENTS

| 3,016,533 | 1/1962 | Frank | 235/150.272 X |
| 3,332,079 | 7/1967 | Sarratt | 343/103 |
| 3,375,520 | 3/1968 | Groot et al. | 343/103 |
| 3,451,144 | 6/1969 | Chao et al. | 35/10.2 |
| 3,517,108 | 6/1970 | McCarthy | 35/10.2 |
| 3,463,866 | 8/1969 | Staples | 35/10.2 |

Primary Examiner—Malcolm A. Morrison
Assistant Examiner—Edward J. Wise
Attorney—Francis L. Masselle and William Grobman

[57] ABSTRACT

A trainer for teaching the principles of Loran and the operation of Loran receivers, which trainer comprises a general-purpose digital computer driving an interface which generates the appropriate Loran signals to simultaneously represent several pairs of Loran transmitters, and Loran receivers which are stimulated by the output from the interface. In addition, a "ship control" is provided by which the trainee can control the speed and direction of the simulated ship and watch the resultant changes affect the Loran reception, and an instructor's console containing equipment which allows an instructor to set up the initial conditions of a problem. The computer is programed to perform navigation computations based upon information applied to it from the instructor's console and the ship control to modify the effects of the simulated ship movement upon the Loran signals which are generated. Several receivers may be stimulated in parallel with the primary receiver.

8 Claims, 10 Drawing Figures

Patented May 23, 1972 3,665,086

INVENTOR.
EDWARD F. MAGEE
BY STEPHEN G. HAUBE

William Grolman

INVENTOR.
EDWARD F. MAGEE
STEPHEN G. HAUBE
BY
William Grobman

INVENTOR.
EDWARD F. MAGEE
STEPHEN G. HAUBE
BY
William Grobman

INVENTOR.
EDWARD F. MAGEE
STEPHEN G. HAUBE
BY
William Grolman

LORAN TRAINER

This invention relates to training devices and particularly to devices for teaching navigational skills.

For centuries man has navigated by the stars and the sun. However, with the increase in the speed of modern vehicles, and with the great expansion of modern travel, more accurate methods of navigation have been required. One of the newer navigational systems is the hyperbolic system which utilizes pairs of radio transmitters with known locations and unique transmission characteristics. One transmitter of a pair can be the master and the other the slave so that the times of the transmission from the two transmitters are controlled and have a fixed relationship to each other. The signals from the two transmitters of a pair are generally received by a vehicle at different times. Plots of the locations of constant time difference from the two transmitters of a pair form hyperbolas, and these are shown on charts which are readily available. A vehicle in the vicinity of a pair of these transmitters can receive the transmissions from both, and on special receivers having built-in cathode ray tube display devices, can adjust the timing of the reception of the signals from both transmitters to determine the time difference between the receptions of the two signals. This time difference indicates a particular hyperbola on the charts. A second reading from a second pair of transmitters indicates a second hyperbola, and where the two hyperbolas cross is the location of the vehicle.

Simulators have been used as training devices in many situations, but they have a special place in dangerous or potentially dangerous situations. A simulator which is to be used for training is constructed to simulate the operation of a device in "real time." That is, the simulator must produce the same effects in the same time that the actual device being simulated does. To improve the versatility of the simulators as well as the accuracy of the simulation, digital rather than analog equipment is being used to an ever greater extent.

An analog device is one which is designed to be an analogy of the actual device. In other words, the analog represents in its physical dimensions the parameters of the device being simulated. The accuracy of simulation then depends upon the accuracy with which the parameters can be converted into dimensions, and this depends, at least partially, upon the scale and size of the simulator. In addition, the dimensions and the shape of the simulator become complex and difficult to fabricate when the parameters of the device being simulated change substantially with operating conditions. Although analog systems are usually rapid in their simulation, they are difficult to modify when the parameters of the device being simulated change.

On the other hand, digital devices are more versatile. Anything whose operation can be mathematically analyzed can be digitally simulated. Once the analysis has been accomplished, the mathematical expressions are converted into a program for a digital computer. Then, as the simulator operates and the simulated conditions change, the changed values are applied to the digital computer which computes the changes in the simulated device produced by those changes. When digitally simulating devices which have complex operation characteristics, the number of computations required is often quite large. This increases the difficulty of simulating complex operations in real time. All of the computations required must be completed and the appropriate results generated to produce the proper simulated response in the time available between an action and the simulator's response to that action. However, new techniques in the analysis of the operation of equipment, new methods of mathematically representing those operations, and new higher speed computers have combined to make possible the realtime digital simulation of equipment that was heretofore difficult to so simulate. In addition, digital simulation is much more versatile since it is comparatively easy to change the character of equipment being simulated, to change the internal condition of a problem, or its location, and to change the rules of the game. With respect to these additions and changes, once the basic simulator has been constructed, it can be used to stimulate actual operational equipment so that the equipment that the trainee is handling during training is the actual equipment he will handle after he is trained. The utilization of a device which generates, under all conditions of operation, the signals which are the same as those the operational equipment actually encounters is particularly important in simulating radio navigation equipment.

It is an object of this invention to provide a new and improved simulator trainer.

It is another object of this invention to provide a new and improved system for simulating radio navigation equipment.

It is a further object of this invention to provide a new and improved device for digitally simulating a hyperbolic radio navigation system.

It is another object of this invention to provide a new and improved hyperbolic radio navigation trainer, which trainer utilizes general-purpose, off-the-shelf equipment to the greatest extent.

Other objects and advantages of this invention will become more apparent as the following description proceeds, which description should be considered together with the accompanying drawings in which.

Figure 1:
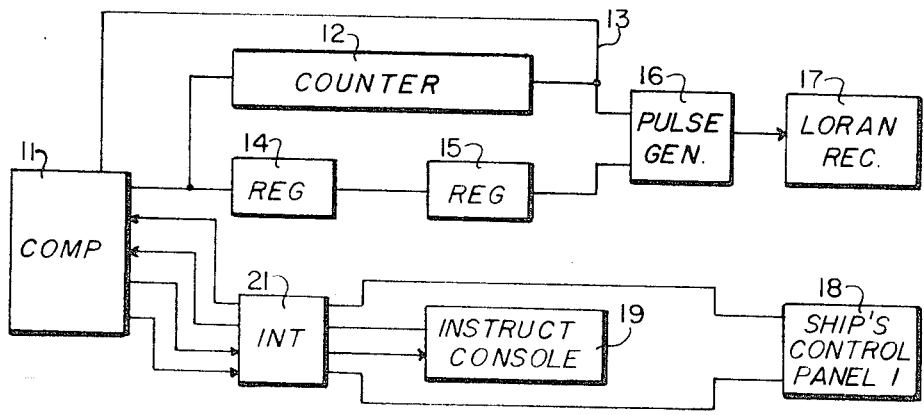
FIG. 1 is a general overall block diagram of a system according to this invention.

Referring now to the drawings in detail, and more particularly to FIG. 1, the reference character 11 designates a general-purpose digital computer. Connected to the output from the computer 11 is a counter 12 whose output is applied to one input of a pulse generator 16 and by a line 13 to the computer 11, and, in parallel with the counter 12, a pair of series registers 14 and 15 are connected. The output from the register 15 is applied to another input to the pulse generator 16. The output from the pulse generator 16 is applied to an input of a standard Loran receiver 17. A ship's control panel 18 is located physically close to the receiver 17 so that the trainee who is operating the receiver 17 may utilize the controls contained on the control panel 18 to supply information concerning the control of the simulated ship. The output from the control panel 18 is applied through an interface 21 to the computer 11. In addition, an instructor's console 19 contains provision for an instructor to supply, through the interface 21 to the computer 11, initial information concerning the problem to be run. Both of the ship control panel 18 and the instructor console 19 contain simple display devices for displaying in digital form information from the computer pertaining to the simulated ship's speed, direction of movement, and location.

The computer 11 is a general-purpose digital computer having computational speed, word size, and other characteristics suitable for use in the equipment of this invention. A particular navigational area such as the area of the sea adjacent to a selected portion of coastline is chosen for the training problem, and a plurality of those Loran transmitters which are actually located in the area selected are used as the simulated transmitters. The geographical locations of these Loran transmitters previously are identified and are related to the boundaries of the selected navigational area or to another position identification system. The computer 11 is programed to perform standard navigation computations using an initial position and ship characteristics selected by the instructor. The speed and direction of movement of the simulated ship is supplied by the trainee from the ship control panel, and this information together with the information supplied by the instructor is continually used by the computer 11 to compute the everchanging position of the simulates ship. In addition to computing the position of the ship-being-simulated with respect to the geographic points identified as fixed, the computer 11 is so continually computing the relative amplitudes and timing of the signals which would be received by the ship upon which the Loran receivers are located in the computed position. As mentioned above, Loran transmitters normally operate in pairs, usually with one transmitter serving as the master and the other transmitter serving as the slave.

In FIG. 1 the output from the computer 11 can be applied to the counter 12 or the register 14, depending upon the instructions and controls in the program. Information fed into the counter 12 is a number which sets the counter. An external pulse source then drives the counter 12 through its count until it reaches its limit. If the counter 12 is an upwardly counting counter, then the overflow is applied to the pulse generator 16; if the counter 12 is a downwardly counting counter, then passage through zero applies a pulse to the generator 16. The time required for the counter 12 to complete its count determines the time between the generation of the Loran pulses by the generator 16. Thus, with fixed frequency external clock, the time between pulses is determined by the size of the number applied by the computer 11 to the counter 12. Since several pairs of Loran receivers are simulated and the repetition rates of the pulses from the several pairs of transmitters are different, the time between pulses received at the receiver is continually changing. Information supplied by the computer 11 to the register 14, however, determines the characteristics of the pulse which is generated by the generator 16. Since the number supplied to the counter 12 may result in a very short count, two registers, 14 and 15, are used in cascade so that information is first transferred into register 14, and then into register 15 while register 14 is being refilled with additional information. Thus, no matter how short the time between pulses, the pulse characteristic information is available. When an output occurs from the counter 12, a pulse is generated by the generator 16. The size, shape, and number of reflections or ghost pulses is determined by the output from the register 15. Thus, information supplied to the generator 16 by the register 15 and by the counter 12 operate together to produce the Loran pulses which are displayed on the display in the receiver 17.

In a trainer of this invention a relatively large area may be represented for navigating purposes. Suppose, for example, the navigational area represented in a particular problem is a substantial portion of the East coastline of North America from South Carolina north to Maine and Nova Scotia and extending into the Atlantic Ocean for about 1,000 miles. The instructor can, by appropriate switches located on the instructor console 19 insert information into the computer 11 which represents the location in this navigational area of the starting point of the problem. In addition, the instructor inserts such information representative of the ship characteristics as its top speed, its rudder delay, etc., and such information as strength and direction of wind and currents. As indicated above, the system of this invention contemplates generating those Loran signals having the actual characteristics of a plurality of actual Loran transmitters located in the area being simulated. The initial location of the simulated ship in the area selected for the problem determines the reception timing and the reception strength of the various pulses from the simulated Loran transmitters. As the simulated ship "moves" through the gaming area, these characteristics of the received pulses will vary with time, and new positions can be determined for the ship as the problem proceed, using the same pulse trains. The computer 11 receives information representing the initial position of the simulated ship as that information is inserted into the system by the instructor. Using this information and additional information received from the ship control console representing the simulated speed and heading of the ship, the computer 11 repeatedly computes the latest position of the ship as the problem proceeds. Since the computer 11 also has available to it information representing the fixed positions of the Loran transmitters and the repetition rates of their pulses, it also computes the relative positioning of the ship and each of the transmitters and determines the timing of the receipt of the pulses at the ship from each of the transmitters. With attenuation data inserted into the computer 11, it can determine the relative amplitudes of the pulses received at the ship and can determine the existence, amplitude, and shape of reflected skywaves. With the computed information, the computer 11 forms a digital word of 15 bits which is inserted into the counter 12. An external clock, not shown in FIG. 1, supplies pulses to the counter 12 which the counter 12 counts. When the capacity of the counter 12 is reached, an output to the pulse generator 16 signals the time to generate the next pulse. Thus, the word output from the computer 11 applied to the counter 12 determines the time until the next pulse is supplied to the Loran receiver 17. Since the relative distance between the ship and any Loran transmitter also determines the amplitude of the received pulse, and the type of Loran system and frequency of transmitted carrier determine the existence or nonexistence of reflected skywaves, this information is also used by the computer to generate a second output word which is applied to the register 14. Immediately after loading counter 12 with the time delay to the next pulse, computer 11 loads register 14 with the characteristic word (i.e., pulse amplitude, etc.) for said pulse. When the capacity of counter 12 is reached, and before pulse generator 16 is triggered, an interrupt signal is sent to computer 11 along line 13. Upon receipt of this interrupt signal, computer 11 immediately sends a new time delay word to counter 12 and the characteristic word to register 14. As the computer 11 sends the characteristic word to register 14, the existing word in register 14 is transferred to register 15. The pulse generator 16 then triggers. At the same time, counter 12 starts counting again and the cycle is repeated.

The time to the next pulse is actually the time required for counter 12 to reach its capacity pulse the time delay before pulse generator 16 is triggered. This added time factor is compensated for in the computer program. The interface 21 is used to ensure that the information into and out of the computer 11 is of the same form which is used in the instructor's console, the ship control panel 18 and the Loran receiver 17. Actually, the counter 12, the registers 14 and 15, and the pulse generator 16 can also be considered to be part of the interface 21, but they have been shown separately therefrom in FIG. 1 to simplify the description.

One point must be kept in mind during the description of the operation of this system. The carrier frequency of the transmission from all of the various Loran transmitters being simulated is the same, but the repetition rate of the transmitted pulses varies from pair-to-pair. Any receiver will receive all of the Loran transmissions from the transmitters within its reception range. Since the rate at which pulses are being transmitted from one pair of transmitters is somewhat different from the rates at which the pulses are being transmitted, at the same time, from other transmitters, the times between pulses at the receiver is continually varying. To avoid the complexity of using separate apparatus designed for each transmitter pair, the system of this invention continually recalculates the time until the next pulse, and supplies this information to the counter 12. Thus, the entire pulse time interface is kept small and reliable.

Figure 2A:
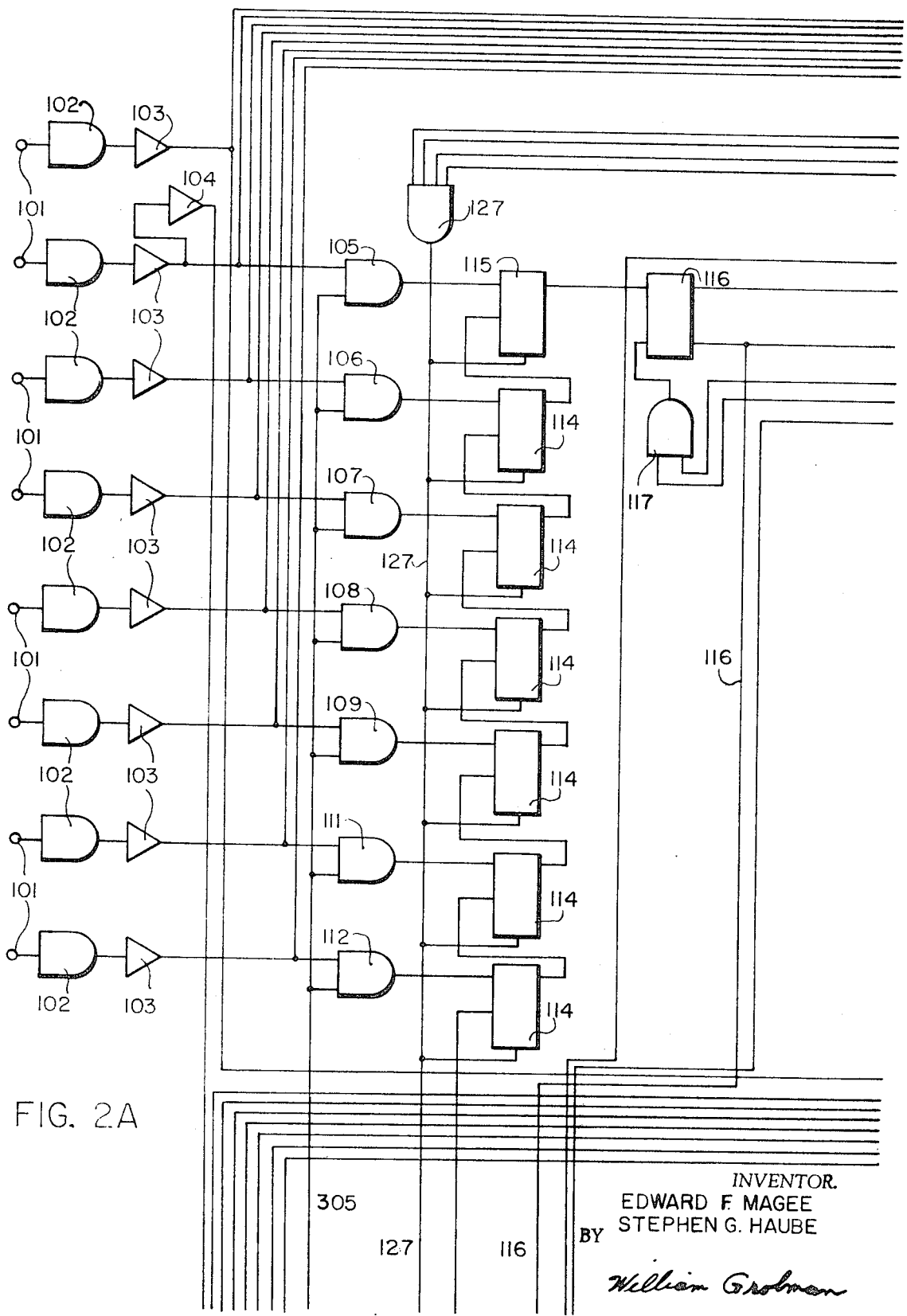
FIG. 2A–2F is a functional block diagram showing details of at least a portion of a system similar to that of FIG. 1.
Figure 2B:
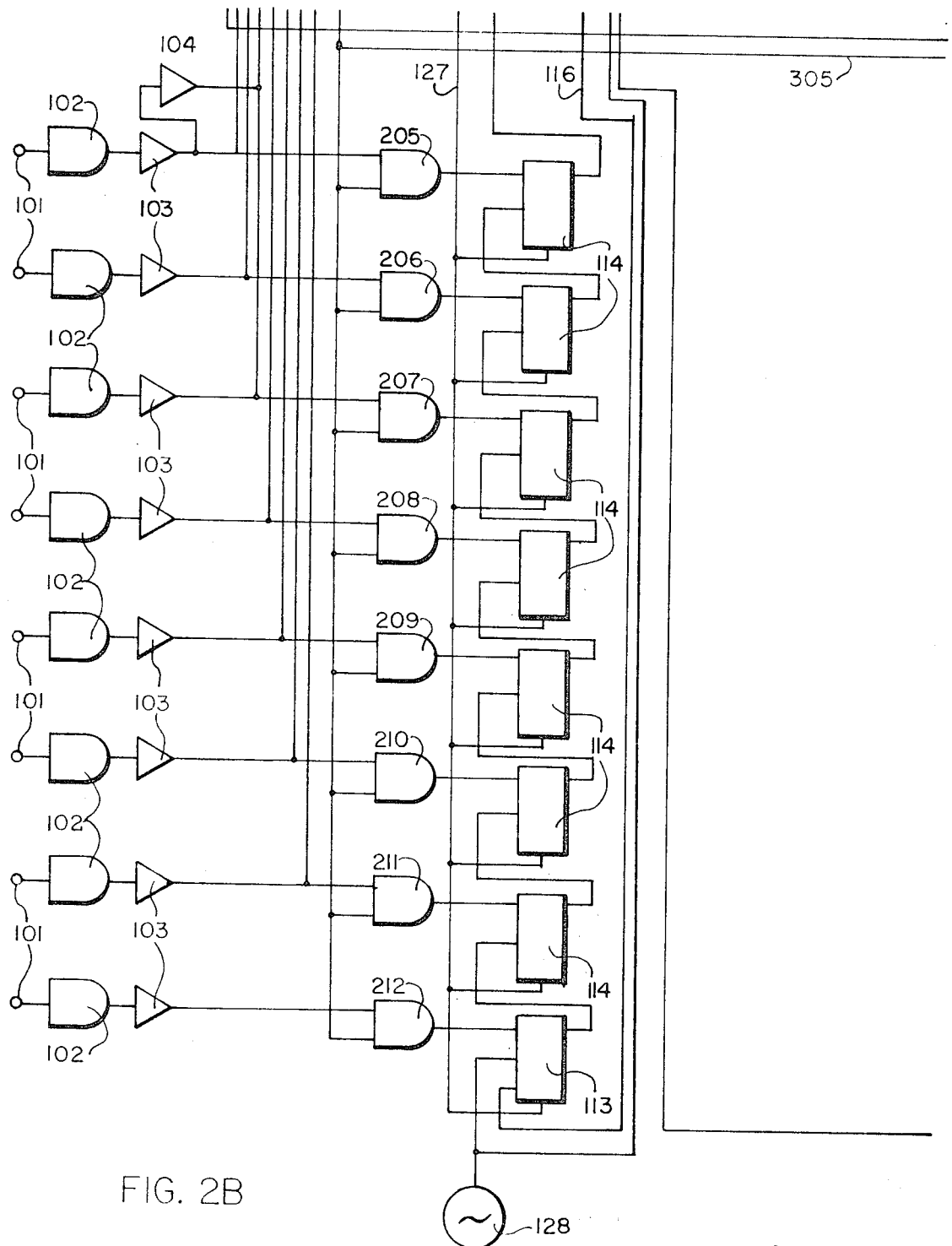
Figure 2C:
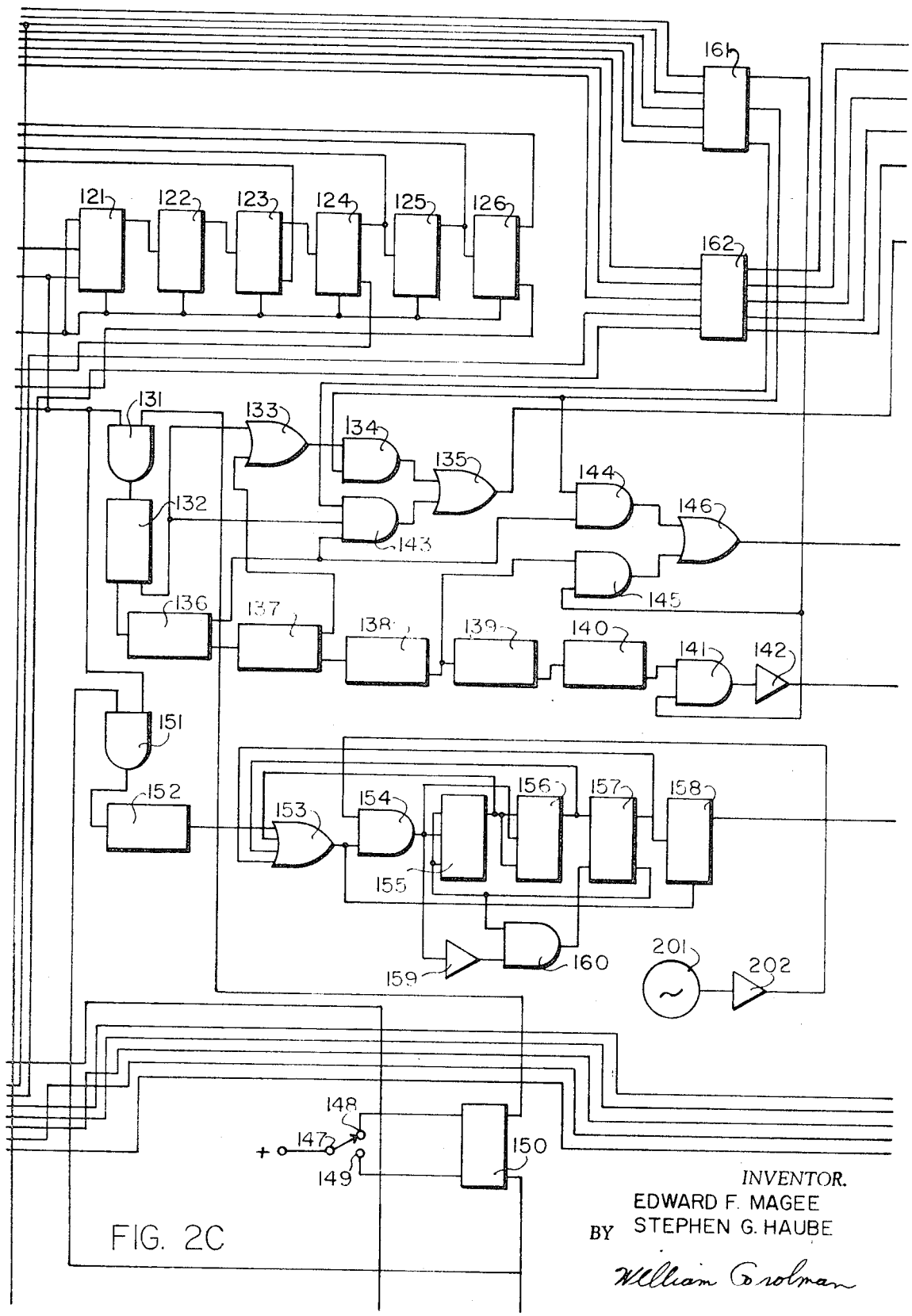
Figure 2D:
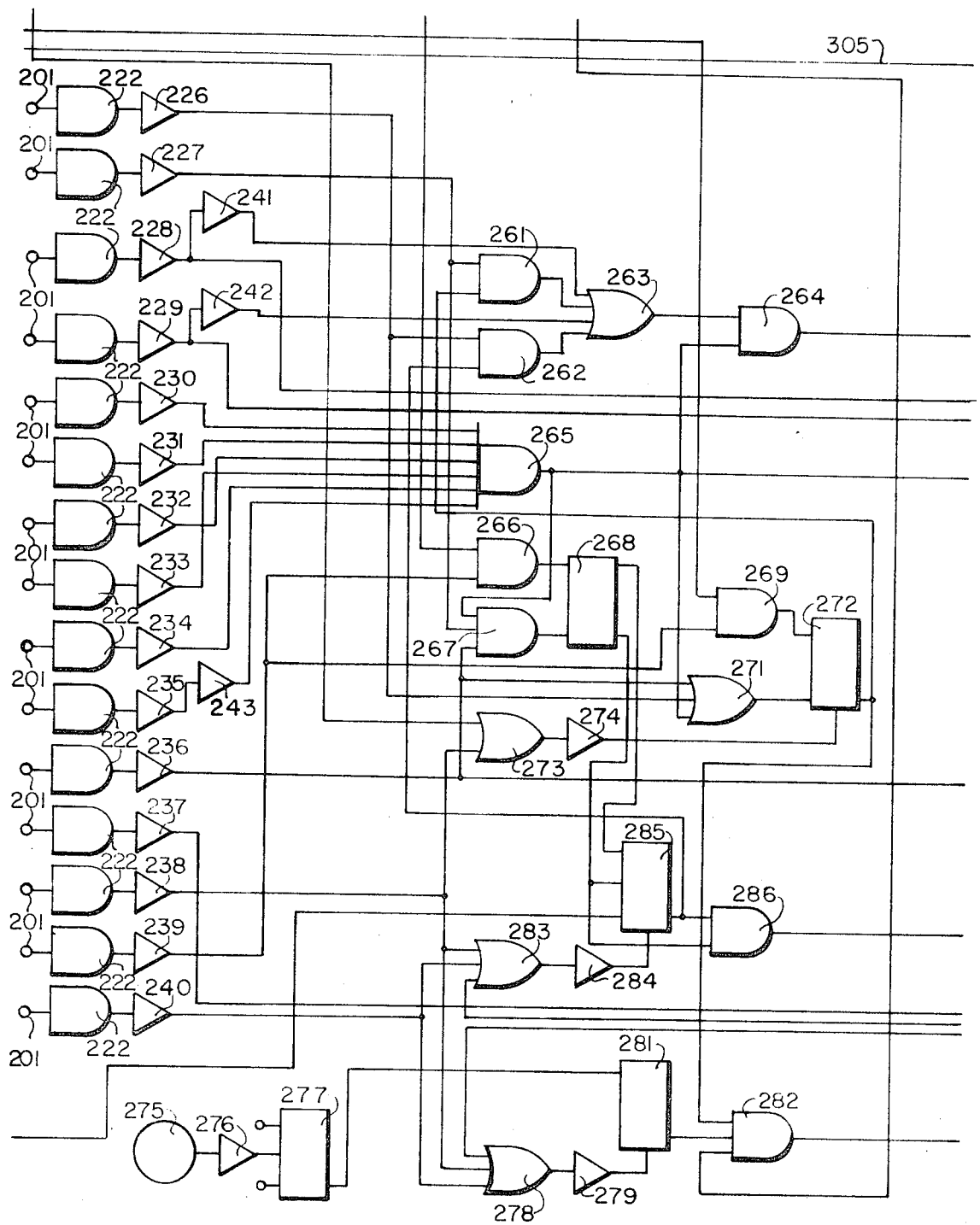
Figure 2E:
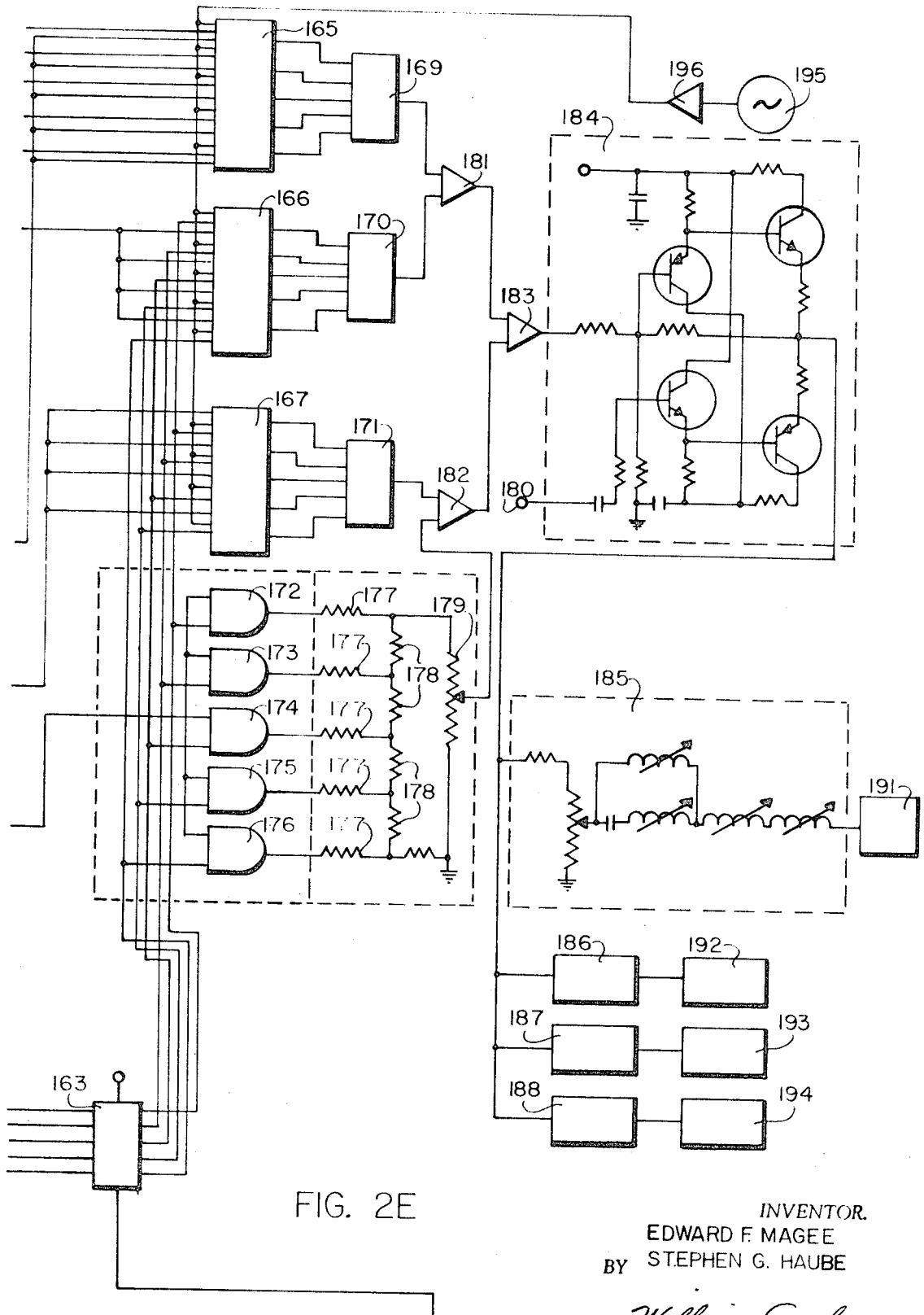
Figure 2F:
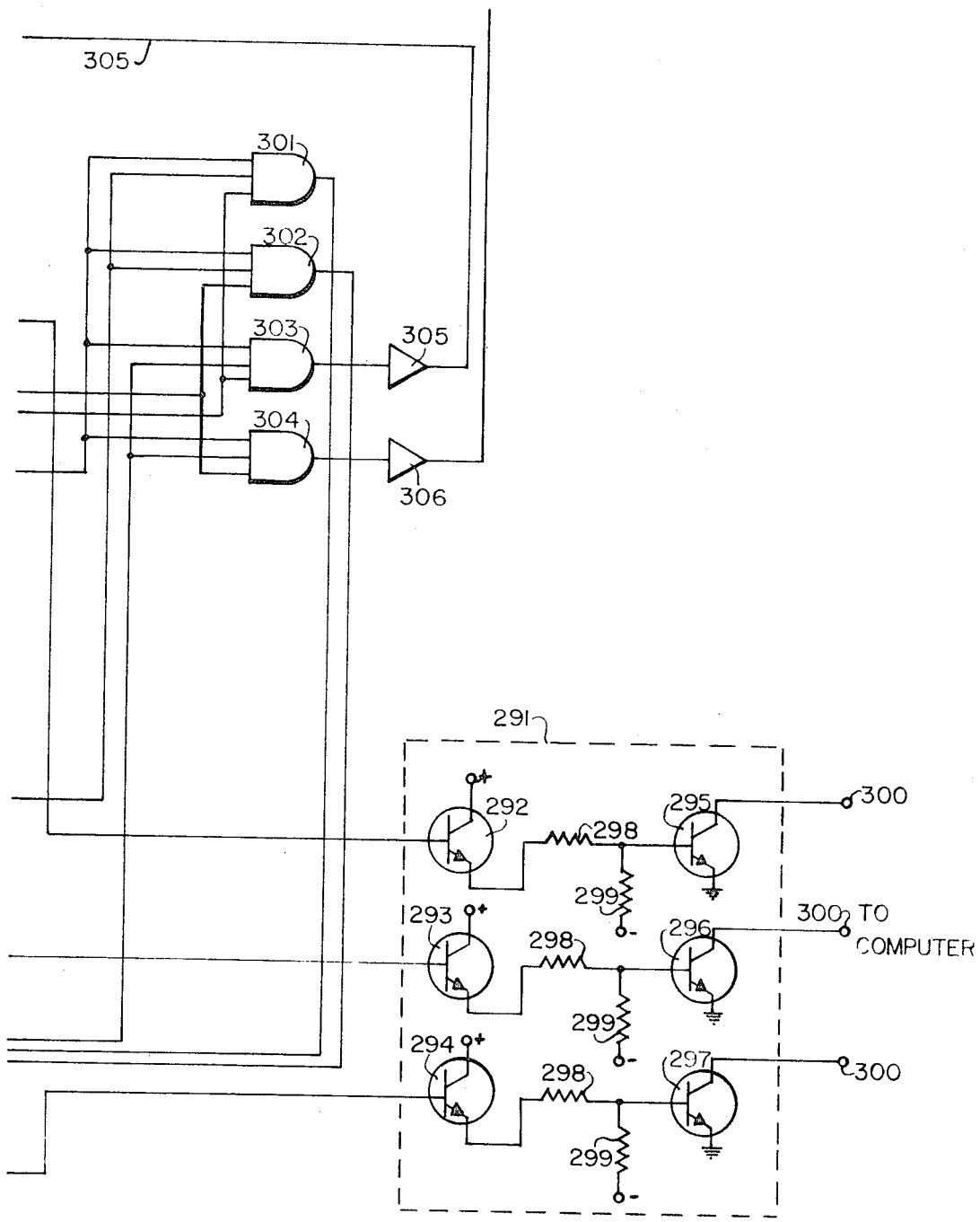

One example of a complete system used for simulating Loran is shown in FIG. 2A–2F. Along the left side of the drawings in both FIG. 2A and 2B are input terminals 101 which are connected to the outputs from the computer 11. Since the computer 11 is any general-purpose, off-the-shelf computer which has the characteristics suitable for this purpose, no particular computer is shown in detail. The input terminals 101 are connected to the inputs of individual input buffers 102, the outputs of which are applied to the inputs of inverter amplifiers 103. Both positive and negative signals are required from some of the input terminals 101, and in those cases, a second inverter amplifier 14 is connected in series with the inverter 103. All of the input terminals carry the same reference character since they are generally discussed in concert, but in those situations where they are individually described, they will be designated by numbers in numerical order with the top input terminal being identified as 1 and the bottom input terminal identified as 16. The inverters 103 carry the number designation with the postsign -, and the inverters 104 would also be designated by a number with the postsign +. The individual outputs from the inverters 103 are applied as separate inputs the individual inputs to gates 105-112 and 205-212. Each gate 105-112 and 205-212 has one input from an inverter 103 and another input from a control line 305. A series of flip-flops 114 are connected together to form a counter with the first stage of the counter designated 113 and the last stage of the counter designated 115. The individual counter stages are clock controlled and have input signals applied to the set or restore inputs conditioning the stage to count, and the clock input actually causing the stage to count. The outputs from the individual gates 105-112 and 205-212 are connected to the restore inputs of the counter stages 113-115, and a clock signal is applied to the clock inputs of the counter stages 113-115 from the set output of the preceeding stage. The output from the stage 115 is applied to the set input of a flip-flop 116, whose restore input is connected to the output from a coincidence gate 117 which has a pair of inputs. The set output from the flip-flop 116 is applied to the restore input of a flip-flop 121, and the set output from the flip-flop 121 is connected to the clock input of flip-flop 122. The flip-flops 121 and 122 and the following flip-flops 123, 124, 125, and 126 are connected as binary counter stages with the set output of one stage being connected to the clock input of the next stage. The set outputs from the stages 124, 125, and 126 and the restore output from the stage 123 are connected as inputs to a gate 127. The restore output of the flip-flop 116 is connected to the clear inputs of the counter stages 121 and 126. The set output of the slip-flop 116 is also applied as an input to gates 131 and 151. The other input to the gate 131 comes from the set output of a selector flip-flop 150, and the other input to the gate 151 comes from the restore output of the selector flip-flop 150. A switch 147 has two stationary contacts 148 and 149, and the stationary contact 148 is connected to the set input of the selector flip-flop 150 while the contact 149 is connected to the restore input of the flip-flop 150. The movable contact of the switch 147 is connected to a source of positive potential. The output from the gate 131 supplies chain of delays 132, 136, 137, 138, 139, and 140 which help determine the characteristics of the pulses generated by the system to represent A-type Loran. The output from the gate 131 is connected to the input of the delay 132, whose output is connected to the input of the delay 136. The output of the delay 136 is connected to the input of the delay 137, whose output feeds the delay 138. The output of the delay 138 is connected to the input of the delay 139, and the output from the delay 139 is applied to the input of the delay 140. The output from the delay 140 is applied as one input to a gate 141, and the output from the gate 141 is fed through an inverter amplifier 142 to one input to each gate of a bank of gates 167. In addition to the delay connections described above, many of the delays have additional outputs. A second output from the delay 132 is applied to one input to an OR gate 133 and as one input to a coincidence gate 143. The other input to the OR gate 133 is a second output from the delay 137. The second output from delay 136 is applied as a second input to the gate 143 and as one input to a coincidence gate 144. Similarly, a second output from the delay 138 is applied as one input to a coincidence gate 145. The output from the OR gate 133 is applied as one input to a coincidence gate 134 whose output is applied to the input to an OR gate 135. The output from the OR gate 135 is applied as one input to each gate of a bank of gates 166. The other input to the OR gate 135 is the output from the coincidence gate 143. Three banks of the registers 161, 162, and 163 are provided for temporarily storing information from the computer 11. Register 161 has five inputs, each of which is connected to an input inverter 103. The five inputs to the register 161 are those inputs which are designated above as inputs 1—, 2—, 3—, 4—, and 5—. Register 162 similarly has five inputs which are connected to the input inverters 103 designated above 6—, 7—, 8—, 9—, and 10—; and register 163 has five inputs which are connected to the outputs from the input inverters 103 designated 11—, 12—, 13—, 14—, and 15—in accordance with the method of designation set forth above. Register 161 has three outputs which are used, and one of those outputs is connected to the third input to the coincidence gate 143. A second output from the register 161 is applied as a second input to each of the gates 134, and 144, and the third output from the register 161 is connected as a second input to each of the gates 141 and 145. The five outputs from the register 162 are applied as individual inputs to individual gates of the bank of gates 165, and the five outputs from the register 163 are applied as individual inputs to individual gates of the banks of gates 164, 166, and 167. In the bank of gates 164, the individual gates are shown and are designated 172, 173, 174, 175, and 176. Each gate has two inputs, one of which is from the output from the register 163.

The output from the gate 151 is applied to a circuit which determines the characteristics of the C-type Loran pulses. The output from the gate 151 is applied to the input of a delay 152, whose output is applied as one input to an OR gate 153, the output from the gate 153 being connected to the input of a coincidence gate 154. The output from the gate 154 is connected to the trigger input to a binary counter stage 155. The set or one output of the binary counter stage 155 serves as the set input to a second counter stage 156, whose set output serves as a set input to a third counter stage 157, whose set output serves as the set input ot a fourth counter stage 158. The output from the gate 154 is also applied as the input to an inverter 159 which serves one input to a coincidence gate 160 and also as the restore input to the counter stage 156. The output from the gate 160 is applied as the restore input to counter stage 157, whose restore output is applied as an input to both the gate 160 and the restore input of the binary counter stage 155. The output from the OR gate 153 is also applied as a reset input to the counter stage 158. The set outputs from the counter stages 155, 156, and 157 are applied as separate inputs to the OR gate 153. The output from the counter stage 158 is applied as one input to all of the gates of the bank of gates 164. Similarly, the output from the inverter 142 is applied as one input to all of the gates of the bank of gates 167, the output of the OR gate 146 is applied to all of the gates of the bank of gates 165, and the output from the OR gate 135 is applied to the inputs of all of the gates of the bank of gates 166. Each of the gates in the banks of gates 165, 166, and 168 has a clock input applied to it from the clock line 196. The outputs from the gates in the banks of gates 164, 165, 166, and 167 are applied to resistor networks as shown in detail in the circuit block designated 168. The output of each of the gates 172 and 176 is applied to one end of a resistor 177 of a group of such resistors. A plurality of resistors 178 are connected together in series, and the other end of each of the resistors 177 is connected to a junction of a pair of resistors 178 to form a ladder network. A potentiometer 179 is connected across the series arrangement of resistor 178 as an output device, and the output from the network 168 is taken from the slide contact of the potentiometer 179 is applied to one input of an operational amplifier 182. The other input to the amplifier 182 comes from the slide contact of a similar potentiometer in the network 171. The outputs from resistor networks 169 and 170 are connected as separate inputs to operational amplifier 181, and the outputs from the two operational amplifiers 181 and 182 are connected as separate inputs to an operational amplifier 183. The output of the operational amplifier 183 feeds a modulator and driver amplifier 184, which has an input terminal 180 for connection to a suitable noise generator to supply the system with Loran noise. The output from the mixer amplifier is applied to the inputs of a plurality of antenna couplers 185, 186, 187, and 188 which are connected in parallel and which individually supply the inputs to a plurality of Loran receivers 191, 192, 193, and 194.

In addition to the input terminals 101 from the computer 11, which terminals are information terminals, there are also provided control terminals 201. The input terminals are individually connected to output terminals from the computer 11 and to separate input buffers 222. Each of the input buffers feeds one inverter amplifier. There are 15 input terminals 201 and 15 buffers 222 used in this device. The uppermost buffer 222 is connected to an inverter amplifier 226, the next one down to an inverter 227, and so forth with the outputs of the buffers 222 being separately connected in individual inverters 226 through 240. As with the outputs of the information input inverters, the signals out from the inverters 226–140 are negative. However, the output from the inverter 228 is applied to an inverter amplifier 214, the output from the inverter 229 is connected to an inverter 242, and the output from the inverter 235 is connected to an inverter 243. The output signals from the inverters 241, 242, and 243 are positive. The output of the inverter 226 is connected to one input of a coincidence gate 262 and as one input of an OR gate 271. The output of the inverter 227 is applied as one input to each of coincidence gates 261 and 267; the output of the inverter 228 is applied as one input to each of coincidence gates 302 and 304. The output of the inverter 229 is applied to one input of each of coincidence gates 301 and 303, and the output of inverter 230 is applied to one input of a coincidence gate 265 which also has inputs from the inverters 231, 232, 234, and 243. The output from the gate 265 is applied to the inputs of gates 301, 302, 303, 304, and 267, as well as to an OR gate 271 and a coincidence gate 264. Inverter 236 is connected to another input of gate 267, and another input of gate 271. Inverter 237 is connected to a third input of the two gates 303 and 304. The output from the inverter 238 is connected to the inputs of an OR gate 273, the other input to which comes from the inverter 103 designated as 3–, and the inputs of OR gates 278 and 283. The output from the inverter 239 is connected as inputs to coincidence gates 266 and 269, and the output from the inverter 240 is connected to the other inputs of the OR gates 278 and 283. A clock generator 275 supplies an output through an inverter 276 to the trigger input of a binary counter stage 277, whose set and restore inputs are connected to sources of electrical energy. The restore output from the stage 277 is applied to the set input of a slip-flop 281 whose restore output is applied as one input to a gate 282 and whose reset input comes from OR gate 278 through an inverter 279. The outputs from the gates 301 and 302 are applied to the inputs of the OR gates 278 and 283. The second input to the OR gate 273 comes from the input buffer 102 (3–), and the second input to the gate 266 comes from the input buffer 102 designated 1–. The output from the inverters 241 and 242 are applied as inputs to an OR gate 263 along with the outputs from the gate 261 and the gate 262. The output from the OR gate 263 is one input to a coincidence gate 264, whose output is applied as an input to an output buffer 291, being connected to the base electrode of a transistor 292 whose emitter electrode is connected through a resistor 298 and across a resistor 299 to the base electrode of another transistor 295. The collector electrode of the transistor 295 is connected to an output terminal 300 which is connected to an input terminal on the computer 11. The output from the gate 266 is applied as the set input to a flip-flop 268 which receives a restore input from a gate 267. The set output from the flip-flop 268 is applied as the set input to a flip-flop 285, and the restore output from the flip-flop 268 is applied as the trigger input to the flip-flop 285 and as one input to a coincidence gate 286. The restore input to the flip-flop 285 is the set output from the flip-flop 116, and the restore output from the flip-flop 285 is applied as the second input to gate 262 and as the second input to gate 286. The output from the gate 286 is applied to another output buffer as the input to the base electrode of a transistor 293 whose emitter electrode is connected through a resistor 298 and across a resistor 299 to the base electrode of another transistor 296. The collector electrode of the transistor 296 is connected to an output terminal 300 which is connected to an input terminal of the computer 11. A reset input to the flip-flop 285 is applied from the gate 283 through an inverter 284. The output from the OR gate 271 is connected to the restore input of a flip-flop 272 whose restore output is connected as the second input to gate 261 and also as the second input to gate 282. The reset input to the flip-flop 272 comes from gate 273 through an inverter 274, and the set input to the flip-flop 272 is applied from the output of a gate 269. The second input to the gate 269 comes from the inverter 104 designated 1+, and the output from the gate 269 is applied as the set input to the flip-flop 272. The restore output from the selection flip-flop 150 is applied as the third input to the gate 282, and the output from the gate 282 is applied to the base electrode of a transistor 294 in the output buffers 291. The emitter electrode of the transistor 294 is connected through a resistor 298 and across a resistor 299 to the base electrode of another transistor 297, whose collector electrode is connected to an output terminal 300 adapted to be connected to an input of the computer 11.

In discussing the operation of this system, let it be assumed that a plurality of pairs of Loran transmitters are being simulated. A pulse train having the proper frequency, time relationship, repetition rate and amplitude must be generated for each Loran transmitter. Each pair of Loran transmitters operates on one frequency and one pulse repetition rate, but the individual pulses of each transmitter of the pair are received by a ship at unique times. The time interval between the reception of the pulses of a pair depends in part upon the built-in delay between the actual transmissions, in part upon the position of the ship with respect to each of the transmitters, and in part upon the repetition rates. Assuming that a Loran receiver on board ship is set to the pulse repetition rate of one pair of transmitters, it will receive the pulses transmitted from the other transmitters also. However, because of the differences in the repetition rates, the pulses from the transmitters to whose rate the receiver is set will stand still on the face of the cathode ray tube whereas the pulses being transmitted by the transmitters to which the receiver is not set will drift across the face of the cathode ray tube at speeds which depend upon the difference between the set rate and those of the other signals. Thus, at any time the Loran receiver sees a pair of stationary pulses whose position on the cathode ray tube screen is determined by the position of the receiver with respect to the two transmitters of the pair and also a plurality of pulses whose time relationship is continually varying. It is the purpose of this system to generate these pulse relationships in a realistic manner for training students in the proper operation of Loran receivers.

The computer 11 performs continual computations to determine the relationship in the position between the simulated movable ship and the simulated fixed Loran transmitters and the continually changing times between pulses. Depending upon these relationships, the computer evolves a word of 15 bits which represents a quantity. When called for, this 15-bit number is applied by the computer 11 to the input terminals 101 and is applied through the input buffers 102 and the inverters 103 to the input gates 105–112 and 205–212. The output from the inverter 305 along line 305 is applied to the other inputs of the gates 105–112 and 205–212 to transfer the information from the computer 11 to the counter stages 113, 114, and 115. Initially, the counter stages 113–115 are cleared to all ones, and information on those lines from the computer 11 which is applied to these counters sets the individual counters to zeroes. The clock 128 applies one megacycle pulses to the counter stage 113 to cause the counter to count down. When the counter has reached all zeros, there is an output signal from the set output of counter stage 115 which sets flip-flop 116. When an interrupt signal is applied to the computer 11 from the restore output of the interrupt flip-flop 285 in response to the output from the flip-flop 116, it instructs the computer to interrupt its computations and to output another word to the input terminals 101. Since this operation takes approximately 40 microseconds of computer time, the binary counter stages 121, 122, 123, 124, 125, and 126 are driven by the output of the clock 128 during this time. It takes this counter approximately 40 microseconds to complete a count, and then the restore output from the stage 126 is applied to the input of the gate 117. When a signal appears on the restore output of stage 124 and also on the restore output of stage 126, a signal passes through the gate 117 to restore the flip-flop 116. This resets the counter stages 121–126 to all zeroes. In the meantime, when the counter stage 123 was in the zero state and counter stages 124, 125, and 126 were all in the one state, a signal was applied through the gate 127 to restore the counter stages 113, 114, and 115 to ones, preparing them for a new word from the computer 11.

At this point it might be well to describe briefly the operation of the computer 11 in computing the output words which are used in this system. As mentioned above, several pairs of Loran transmitters are simulated. Each master transmitter has an assigned repetition rate of pulse generation, and each slave transmitter has the same repetition rate as its master with the slave pulse being delayed after the generation of the master pulse by a fixed time interval. Starting at time zero, each master transmitter has a time of appearance assigned by the computer to its next pulse and the slave transmitters have similar times assigned. In addition to the times for the initial pulse generation, the computer computes the special relationships between the individual transmitters and the simulated ships, so that the fixed delays for the slave pulses may be modified to represent the ship-transmitter relationship also. In addition, each transmitted pulse may have skywaves associated with it. Assuming that each transmitter has four skywave pulses associated with it, and that there are five pairs of transmitters, 50 pulses are generated by the system. The initial time of generation is calculated and represented as the time between pulses, and the numbers representing this information are then stacked in a suitable register in the computer in sequence. After one of the numbers is pulled from the stack and applied to the output of the computer 11, its repetition rate is added, and the number representing the next time of generation is thereby computed. The recomputed numbers are then stacked in sequence. Since the repetition rates differ, the pulses will drift through the various stacks as they are assembled. These computations continue in a never-ending pattern. In addition, the computer 11 computes the number which represents the characteristics of the individual pulses, and these are interposed between adjacent numbers representing the times of generation of the pulses so that the number representing the characteristics of a pulse immediately preceeds the number representing the time of generation of that pulse. Each such stack of words must be computed and assembled during the time between the pulses having the highest repetition rate.

The system of this invention is designed to simulate both A-type Loran pulses and C-type Loran pulses. Switch 147 is representative of a selection control which determines which type of Loran pulses will be simulated. When the switch 147 is in contact with the stationary contact 148, the flip-flop 150 is set, and applies the second signal input to the gate 131. When the set output from the flip-flop 116 is applied through the gate 131, a signal is applied to a chain of delays 132, 136, 137, 138, 139, and 140. In A-type Loran, the frequency of the carrier is approximately 1,950 kiloHertz, and skywaves are often produced. Reflections of the skywaves from the ionosphere produce secondary pulses and reflections which show up on the Loran receiver cathode ray tube. Very often, these pulses will have multiple peaks, usually not of the same amplitudes. The chain of delays 132–140 provide a plurality of output signals at various times, which signals can be combined to form multiple skywave reflections having one or more peaks. The ground wave signal passes from the output of the delay 140 through the gate 141 and the inverter 142 on the first pass through the delays, and is applied to the inputs to all of the gates in the bank of gates 167. In the meantime, an output from the delay 132 passes through the OR gate 133 to the coincidence gate 134 where it may be combined with the output from the register 161 to form a signal which passes through the OR gate 135 and is applied as one input to the bank of gates 166. In a similar manner, the output from the delay 136 may pass, together with the output from the delay 132 and another output from the register 161, through the gate 143 and the OR gate 135 to the same bank of gates 166. The inputs to the register 161 are applied from the input buffer stages which were identified earlier as 1–, 2–, 3–, 4–, and 5–. When the word from the computer 11 contains, for example a 5– signal, this is applied to the input of register 161. The 5– output from register 161 is applied as one of the three inputs to the gate 143. Therefore, when a pulse appears at the output of the delay 132 and also at the output of the delay 136 at the same time that a 5– signal is stored in the register 161, the gate 143 applies its output through the OR gate 135 to one input to all of the gates in the bank of gate 166. At the same time, a carrier signal having a frequency of 1,950 kHz is applied from the generator 195 through the amplifier 196 to another input of all of the gates of the bank of gates 166. The third signal to the individual gates of the bank of gates 166 is applied from the output of register 163. The input of register 163 comes from the last 15 bits of the word transferred to the input of this system from the computer 11. Thus, if a 15– signal is present, then the last 5 bits of the gate in the bank of gates 166 opens to permit a number of cycles from the generator 195 through. Of course, a plurality of gates from the bank 166 can be opened at the same time, and which gates are opened depends upon the configuration of the output word from the computer 11, and the number, shape, and size of the pulses depends upon the gates which are opened. The outputs from the gates in the bank 166 are applied to individual resistors in the ladder 170, which resistors 177 are of different values. The amplitudes of the signals applied to the ladder 170 are combined through the resistors 178 to determine the final amplitude of the output Loran pulse, which is then applied through the amplifiers 181 and 183 to the mixer 184. Noise from any suitable white noise generator is applied to the input terminal 180 of the mixer 184 where the output from the amplifier 183 and the noise generator applied to the terminal 180 are combined. The output from the mixer 184 is then applied in parallel to the inputs to the antenna matching networks 185, 186, 187, and 188 for application to the receivers 191, 192, 193, and 194. Only one pulse has been described above, but pulses are applied from the gates 134, 143, 144, 145, and 141 through the OR gates 135 and 146 and through the amplifier 142 to be combined in various combinations in the banks of gates 165, 166, and 167 and in ladder networks 169, 170, 171, and 168 to produce repeatedly recurring trains of pulses of varying amplitudes and configurations for application to the mixer 184.

When the switch 147 is in its other position so that it contacts the stationary terminal 149, the flip-flop 150 is placed in its restored condition, and the signal which was applied to the gate 131 is removed therefrom and a corresponding signal is applied to the input of gate 151. The system now simulates C-type Loran pulses. In C-type Loran a single master transmitter drives up to four slaves in sequence. Thus, the pulses from the C-type Loran system are a series of pulses of the same carrier frequency in fixed time relation. The transmission of the pulses are synchronized one with another, but their reception by a single Loran receiver may not be. Since the individual C-type Loran transmitters are spaced over a geographical area in known positions, the time of transmission from any one of these transmitters to a single Loran receiver will be different from the time of transmission from another of these Loran transmitters to the same receiver. However, the initial transmitted pulses are synchronized one with another. The output signal from the gate 151 is applied through a fixed delay 152 to the input of the OR gate 153. It passes through the OR gate 153 and is simultaneously applied to one input of a gate 154 and to the reset input of a binary counter stage 158. A generator 201 generates a continuous wave signal at a frequency of 100 kHz which is the carrier frequency of C-type Loran signals. The output from the generator 201 is applied through an amplifier 202 to the other input of the gate 154. Thus, when a pulse passes through the delay 152, a burst of 100 kHz cycles is applied through the gate 154 to the input of a binary counter stage 155. This sets the counter stage 155 and applies a signal to the input of counter stage 156. The output from the gate 154 had also been applied to the restore input of the binary counter stage 156 so that when the stage 155 produces an output, it changes the state of the counter stage 156. The set output from the counter stage 156 is applied to the set input of the counter stage 157. The output from the gate 154 was also applied through an inverter 159 to one input of a gate 160. When the stage 157 is restored, a second signal is applied to the input of gate 160 to permit an output signal which maintains counter 157 in the restored state. When counter stage 157 is set, its output is applied to the count input of the final stage 158. Stage 158 produces an output signal which is applied to all of the inputs of the gates 172–176 of the bank of gates 164. In the mean time the set output from counter stage 155 is applied as an input signal to the OR gate 153 to cause that gate to pass a signal as indicated hereinabove. Each time a pulse passes through the gate 153, the counter stage 158 is restored. Similarly, the set outputs from the stages 156 and 157 are applied as inputs to the OR gate 143. In this manner a prescribed number of pulses are applied through the gate 153 to produce output signals from the output stage 158. This determines the one master pulse and the four slave pulses which constitute the C-type Loran signals. The amplitudes of these pulses are determined in the same manner as the amplitudes of the A-type Loran pulses. Information from the last five digits of the word applied from the computer 11 are applied to the register 163. The outputs from the register 163 are applied to individual inputs of the separate gates 172–176 and the bank of gates 164. Those gates which have two such signals applied to their inputs, one from each of the counter stage 153 and the register 163, produce outputs which are applied through the resistors 177 and the resistors 178 to be combined across the potentiometer 179. Again, these signals are applied through the amplifier 182 and the amplifier 183 to the mixer 184 where they are combined with noise applied to the terminal 180. As described above, the output from the mixer 184 is applied through the antenna couplers 185–188 to the Loran receivers 191–194. Thus, this system generates both A-type and C-type Loran pulses, and determines both the time of generation and the amplitude of the pulses which are applied to the Loran receivers. The time and amplitude of the pulses applied to the Loran receivers is determined by the computer 11 and the navigation computation it performs in determining the relative positions of the moving Loran receiver and the plurality of fixed Loran transmitters.

The interface shown in FIG. 2A–F includes three output terminals 300 to the computer 11. There are, of course, other output terminals to the computer 11, but primarily they are information terminals which apply to the computer 11 information from the instructor station and the ship control console. In both cases, the information is inserted by the instructor or the trainee by a simple means such as a multiposition switch, a pulse generator such as a telephone dial, a keyboard, or the like, and the information is transmitted through the interface to the computer inputs. Rather than describe this circuitry in detail, examples of the information transmission to the computer will be presented below. However, in addition to the information to be inserted into the computer 11, there are three instructions which must be applied. These orders are applied to the computer 11 through the terminals 300. Each of the terminals 300 has its own driver amplifier to ensure that the pulses applied to the computer have sufficient amplitude to perform the job. The input to the amplifier 292 is the Device Ready signal which indicates to the computer 11 that the interface is ready to receive additional information. The input to the amplifier 293 is the A-Priority Interrupt signal which indicates to the computer that computations should be interrupted for A-type Loran information to be transferred to the interface. The input to the amplifier 294 is the C-Priority Interrupt signal which indicates to the computer that the computations should be interrupted to transfer to the interface information for C-type Loran. In each of these cases, the signal applied to the terminal 300 occurs only when a plurality of conditions are satisfied both in the computer 11 and in the interface.

Consider, for this example, the generation of the ready signal applied to the amplifier 292. This signal emanates from the gate 164 and occurs only when one of the four inputs to the OR gate 263 is present and, at the same time, there is an output from the gate 165. Gate 165 passes an output only when the computer supplies signals to the input buffers 222 and the inverters 230, 231, 233, 234, and 243. These outputs from the computer 11 serve as an address which is decoded in the gate 265. Thus, even though a signal is passed through the OR gate 263, unless the proper combination of inputs from the computer is received, there is no indication that the system is ready to receive information. There are four possible signals which can pass through the OR gate 263. Of these, two are inputs from the computer which are applied through the inverters 241 and 242. Another signal comes through the gate 261 which receives one input from the inverter 227 and another input from the restore output of the flip-flop 272. Similarly, the fourth signal comes from the gate 262 which receives one input from the inverter 226 and another input from the restore output from the flip-flop 285. The flip-flop 272 is the A-type Loran interrupt flip-flop, and the flip-flop 285 is the C-type Loran interrupt flip-flop. Thus, when the appropriate interrupt flip-flop signals the computer to interrupt computations and supply additional information, it also applies a signal to the gate 261 or 262. When the computer 11 applies an output signal to the proper input to the interface through either inverter 226 or inverter 227, the gate 261 or 262 passes a signal through the OR gate to the gate 264. Then, when the proper address outputs from the computer 11 are also present, the gate 264 opens, and applies a ready signal to the computer 11 so that the information transfer can take place. Should the combinations of six signals applied to the gate 265 be present at the output from the computer 11 at the same time that a signal is also applied through either of the inverters 241 or 242, a ready signal will also be applied to the computer for information. In a similar manner, the two interrupt flip-flops may be reset to apply signals to the gates 286 or 282 to signal the computer to transfer information of the proper type into the system.

Figure 3:
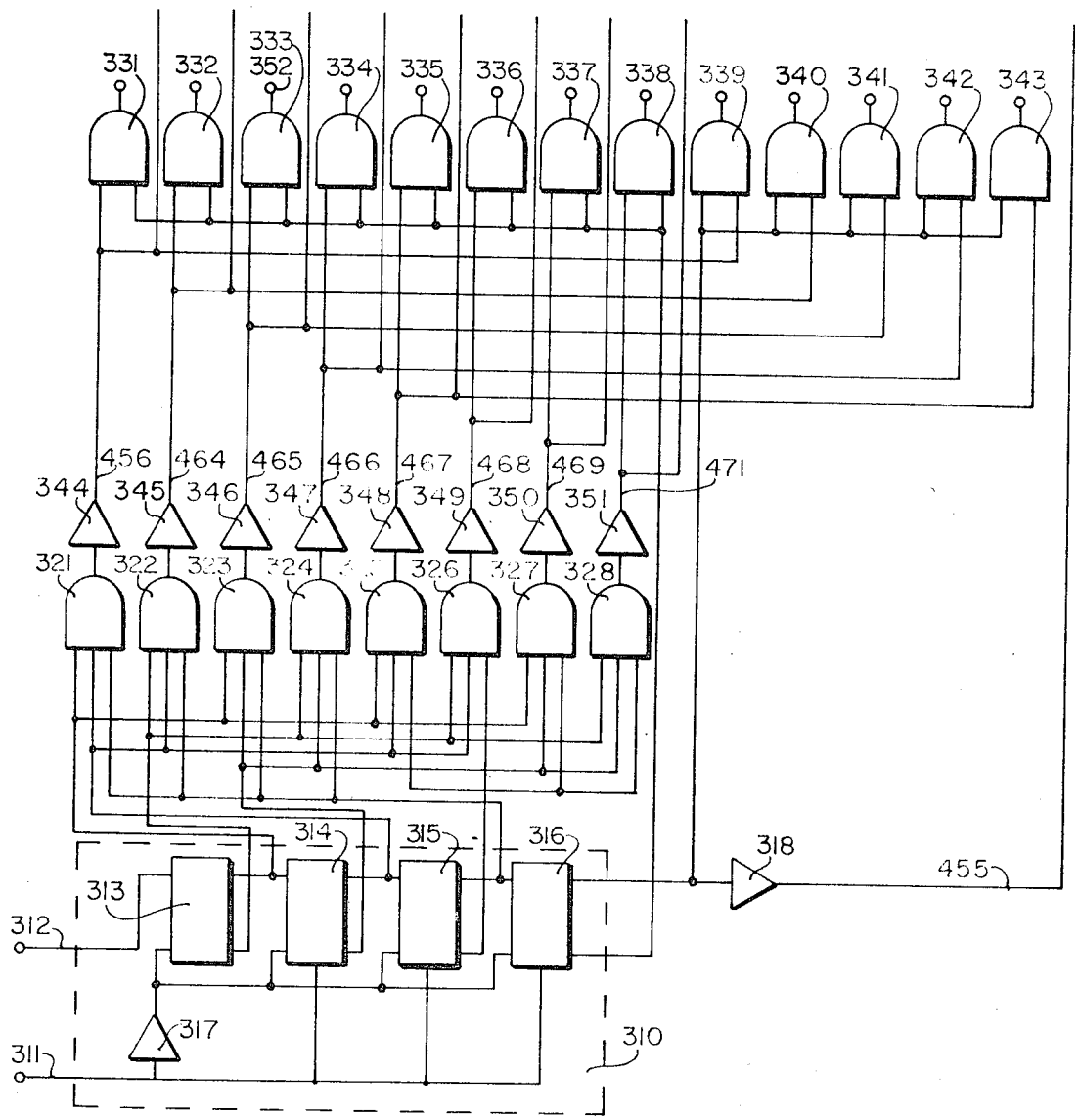
FIG. 3 is a block diagram of an address counter and decoder.

Two of the important aspects of the device of this invention from a training point of view is the ability to control the operation of the system from the instructor station and control console and also to display information such as speed and direction to both the instructor and the trainee, either on demand or automatically. In brief, the instructor station 19 comprises a plurality of switches by means of which the instructor can manually insert into the computer program prescribed initial conditions. Since a digital computer is used in this system, the information is inserted by the instructor by selecting one of a plurality of lines for each piece of information. Thus, consider the maximum speed of the ship. Assuming that the trainee is given the control of speed by the selection of such speeds as ahead or back, full one-half slow, or dead slow, then the maximum speed specified by the instructor determines the actual simulated speed in knots at any of these speed positions selected by the trainee. The instructor can have as choices, for example, maximum speeds of 15, 20, 25, or 30 knots. By setting his selector switch at the desired setting, this information, and similar other information, can be entered into the computer for the computations required. To maintain simplicity in the construction and operation of the apparatus, the information inserted into the computer by the instructor and the trainee is programed into a specific pattern or sequence which is always followed. In this manner, the type of information (speed, heading, etc.) is identified by the position it occupies in the sequence. To maintain the proper sequence and operation, an address counter is used as part of the interface 21 to read the various switches in the proper order. In FIG. 3, the address counter is identified by the reference character 310, and it comprises flip-flops 313, 314, 315, and 316. The stepping input to the counter 310 is applied to line 312 from the computer 11 at the times determined by the program. The counter reset pulse is applied from the computer 11 through line 311, and through an inverter 317 to the zero inputs of the flip-flops 313-316. The counter decoder comprises a plurality of gates 321, 322, 323, 324, 325, 326, 327, and 328. Each of the gates 321-328 has three inputs which are connected to combinations of the zero and one outputs of the flip-flops 313-316. The one output from flip-flop 313 is applied to one input of each of gates 321, 323, 325, 327, and the zero outputs from the flip-flop 313 is connected to one input of each of gates 322, 324, 326, and 328. Similarly, the outputs from the flip-flops are connected to the gates as shown in the table below.

| Flip-Flop | Output | Gate |
| --- | --- | --- |
| 313 | 1 | 321, 323, 325, 327 |
| 313 | 0 | 322, 324, 326, 328 |
| 314 | 1 | 321, 322, 325, 326 |
| 314 | 0 | 323, 324, 327, 328 |
| 315 | 1 | 321, 322, 323, 324 |
| 316 | 0 | 325, 326, 327, 328 |

When any of the gates 321-328 have three input signals applied simultaneously to it, it generates an output signal which passes through the appropriate one of inverter drivers 344, 345, 346, 347, 348, 349, 350, and 351. Each gate of a second bank of gates 331, 332, 333, 334, 335, 336, 337, 338, 339, 340, 341, 342, and 343 has two inputs applied to it, one input to all of gates 331, 332, 333, 334, 335, 336, 337, and 338 is connected to the zero output of the flip-flop 316, and one input to all of gates 339, 340, 341, 342, and 343 is connected to the one output of flip-flop 316. The second input to gate 331 comes from inverter 344, that to gate 332 from inverter 345, that to gate 333 from inverter 346, that to gate 334 from inverter 347, that to gate 335 from inverter 348, that to gate 336 from inverter 349, that to gate 337 from inverter 350 and that to gate 338 from inverter 351. The second input to gate 338 from inverter 351. The second input to gate 339 comes from inverter 344, to gate 340 from inverter 345, to gate 341 from inverter 346, to gate 342 from inverter 347 and to gate 343 from inverter 348.

In operation, the counter 310 is first cleared to all zeros by the application of a pulse on the line 311 from the computer 11. Once the counter 310 has been cleared to zero, each subsequent pulse on line 312 from the computer 11 steps the counter one count. The application of the stepping pulse to flip-flop 313 through line 312 causes that flip-flop to change its state. Each subsequent pulse applied to the input of flip-flop 313 causes a change in state of that flip-flop, and these changes are passed down the counter 310 in the manner of any binary counter. At any instant, the combination of the outputs from the counter 310 energizes one of the gates 321-328. Suppose, for an example, that flip-flop 313 is in the one state, flip-flop 314 is in the zero state, 315 is in the one state, and 316 is in the zero state. Referring to the table given above, the only gate which has all three inputs energized under these conditions is gate 323. The output of gate 323 is applied through the inverter 346 to one input of the gate 333 and of the gate 341. Since the flip-flop 316 was specified as being in the zero state, the gate 333 is opened, and a signal applied to its output terminal 352. The output lines of the gates 331-343 are connected to the instructor station, one line to the movable contacts of each rotary switch at the instructor station, and to the two control panels, one line to each of the two switches on each panel.

Figure 5:
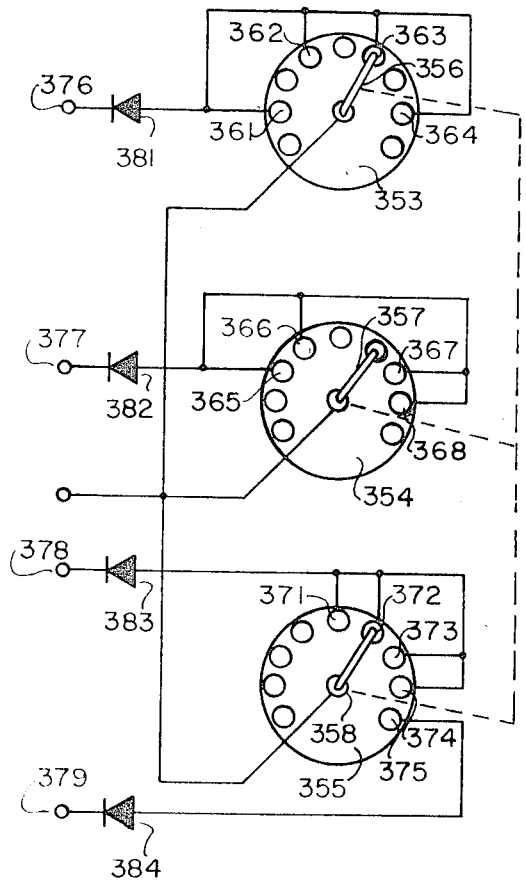
FIG. 5 is a schematic circuit diagram of a portion of the system of this invention which enables information to be manually inserted into the system.

As illustrative of the switching arrangements provided in a system of this type, one bank of three rotary switch decks have been shown on FIG. 5. The three decks are identified by characters 353, 354, and 355. Each deck carries a rotary contact 356, 357, and 358 respectively, and a number of stationary contacts, only some of which are used at any time. The rotary contacts 356, 357, and 358 are all connected to an input terminal 352, which is the output terminal for the gate 333. On deck 353, contacts 361, 362, 363, and 364 are connected together and to a terminal 376. On deck 354, contacts 365, 366, 367, and 368 are connected together and to a terminal 377. And on deck 355, contacts 271, 372, 373, and 374 are connected together and to a terminal 378, and contact 375 is connected to a terminal 379. The terminal 376 is connected to its contacts through a diode 381, the terminal 377 is connected to its contacts through a diode 382, the terminal 378 is connected to its contacts through a diode 383, and the terminal 379 is connected to terminal 375 through a diode 384. The three decks shown in FIG. 5 comprise a single switch, in this case the speed control switch on the ship control console 18 which is manually set by the trainee.

For this discussion, assume that the trainee has set the rotatable contacts 356, 357, and 358, which are mechanically ganged to move together, at 1 o'clock, Ahead-Dead Slow. When gate 333 is energized, a pulse passes through it to the terminal 352. The terminal 352 is connected to the three movable contacts 354-356, so the pulse is then applied to the contacts 363 and 372. Since the contact 363 is connected to terminal 376, and the contact 372 is connected to the terminal 378, the pulse is applied to these terminals and appears at the same terminals on FIG. 4. Only one switch is shown on FIG. 5 to avoid cluttering the drawings even more than they are now. For the same reason, the interconnections between the switch and the rest of the circuitry are not shown. The switching arrangement shown is but exemplary. It should be clear that as many switches as desired can be provided, each switch adding another parameter to the system. But, it must also be borne in mind that variable information added by the way of switches increases the complexity of the circuitry and the time required for scanning the switches. As indicated above, the scanning of the switches is performed by the counter 310 of FIG. 3. As the counter 310 has input pulses applied to it along line 312, the flip-flops 313-316 change condition in a normal binary sequence. Thus, flip-flop 313 is changed to the one state, and when it is returned to the zero state on the next pulse, flip-flop 314 is placed in the one condition. Two more pulses on line 312 place flip-flop 313 in the one state again, and then in the zero state, the last change placing flip-flop 314 back in the zero state and putting flip-flop 315 in the one state. As the counting proceeds, the particular gate 321-328, which is opened, changes to apply pulses to the various switches to which the individual gates are connected, in sequence. Since this sequence is fixed, the information applied to the computer 11 is in a fixed order, and the information need not be otherwise identified.

Figure 4:
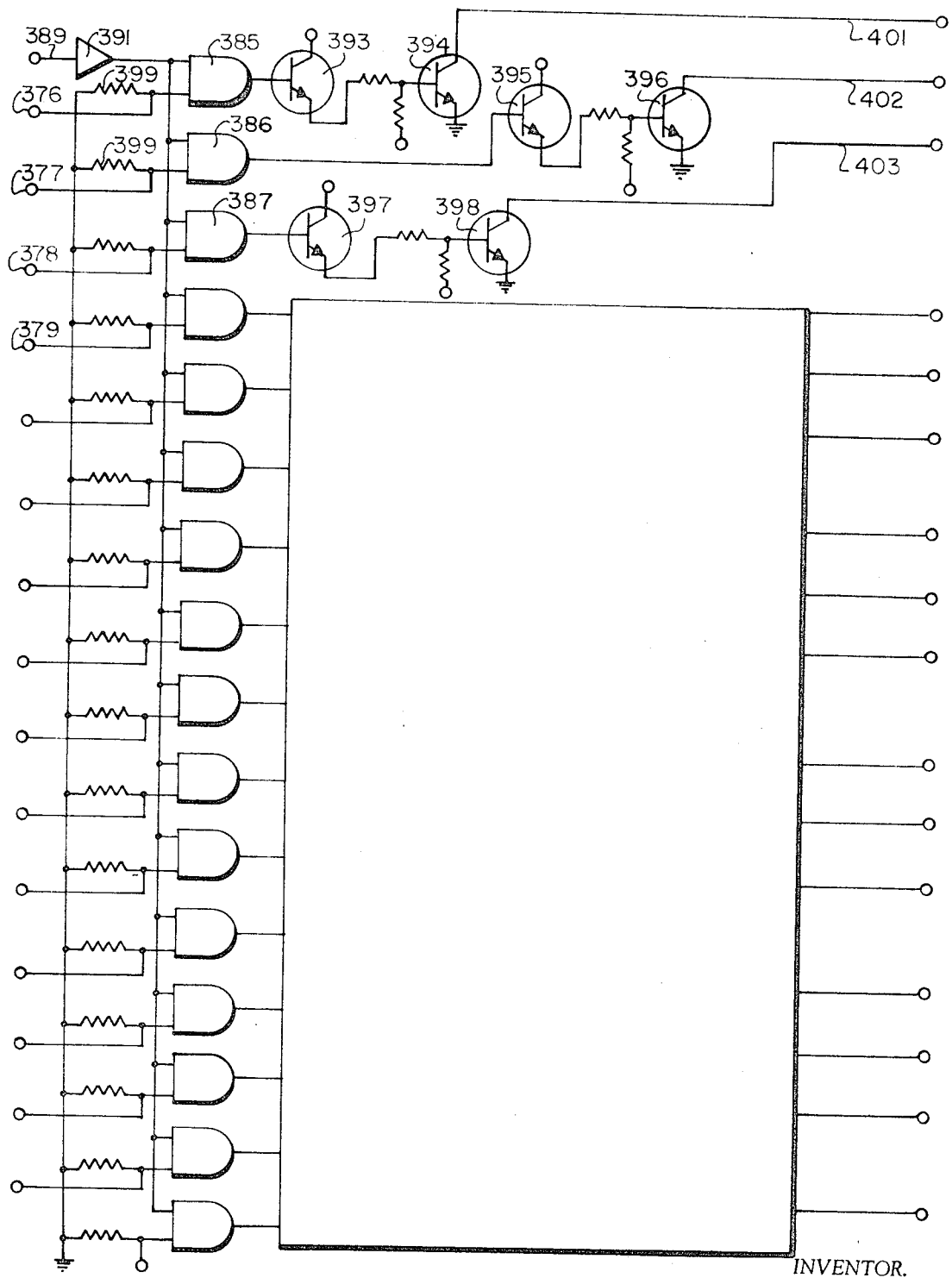
FIG. 4 is a block diagram of the output buffers of this system.

The contacts of the switches are connected by means of terminals, such as terminals 376, 377, 378, and 379, to input lines of the output buffer which is shown in FIG. 4. Since all of the output buffers are the same, only a few will be described. The output terminals from the switch decks 353, 354, and 356 are 376, 377, 378, and 379. These are four of the input terminals of the output buffer. Remember, the output buffer supplies the inputs to the computer 11. The terminal 376 is connected as one input to a gate 385, the terminal 377 is one input to a gate 386, the terminal 378 is one input to a gate 387 and the terminal 379 is one input to the gate 388. The second input to each of these gates 385-388 is applied to line 389 from the input enable line which carries the signal causing the gates in the output buffer to open and pass information to the computer 11. The outputs of the gates are applied to transistors. The output of gate 385 is connected to the base electrode of a transistor 393 which is connected in cascade with a transistor 394. The output from transistor 394 is applied to an output terminal 401 which is connected to one of the computer input lines. The output of gate 386 is applied through transistors 395 and 396 in cascade to a computer input line 402, and the output of gate 337 is applied through transistors 397 and 398 in cascade to the computer input line 403. Since all of the remaining input buffer stages are the same as those shown, they are not further described. In fact, the remaining transistors are not even shown for greater simplicity.

As indicated above, this description is but an example of the apparatus which can be used to carry out the principles of this invention. The above specification has described a new and improved system for simulating present hyperbolic radio systems of navigation, which system includes means for initially locating the position of a simulated ship in a simulated play area and means for controlling the speed and direction of movement of that ship through the play area. Also, the system of this invention provides means for simulating the operation of well known navigational transmitters with due regard to realistic behavior. Skywaves as well as ground waves are simulated, and the pulses which are received by the simulated receiver, drift with changing times of occurences as they do in actuality. In addition, all of this is accomplished with a minimum of special equipment. The system of this invention is designed to utilize, to the greatest extent possible, off-the-shelf equipment.

What is claimed is:

1. A radio navigation training system comprising a sourse of digital numbers, at least one radio navigation receiver, and means interconnecting said source and said receiver for transforming the outputs from said source into signals which simulate radio navigation transmissions, and means for applying said signals to said receiver, said interconnection means comprising at least a counter and a first register, at least one input to each of said counter and register being connected to an output of said computer so that digital information from said computer is inserted into said counter and said register, and clock pulse means connected to said counter to cause said counter to count at a prescribed rate from the value of the information inserted therein by said computer to the count limit of said counter, said counter generating an output signal when said limit is reached.

2. The trainer defined in claim 1 wherein said interconnection means further includes a first signal generator, said signal generator comprising a first register, a plurality of delay means, means for applying the output from said counter to the inputs of said register and said delay means, said counter input determining the time of occurrence of said signals, said register determining the length of the output signals from said signal generator and said delay means determining the number and time intervals between output signals from said signal generator.

3. The trainer defined in claim 2 wherein said interconnection means further includes means for connecting the output of said counter to an input of said source so that the output signal which indicates when a signal should be generated by the generator also indicates to the source when to transfer additional numbers into said counter.

4. The trainer defined in claim 3 wherein said source of digital numbers comprises a general-purpose digital computer.

5. The trainer defined in claim 4 further including a ship control panel, and means for connecting the output from said panel to inputs to said computer, said panel comprising means for generating signals representing vehicle speed and direction.

6. The trainer defined in claim 5 further including an input console, means for connecting the outputs from said console to inputs to said computer, said console comprising means for inserting into said computer information representing initial conditions for the operation of said trainer.

7. A system for simulating a Loran navigational system for training purposes, said system comprising a general-purpose digital computer, a counter for receiving digital word outputs from said computer, a clock, means for applying the pulse outputs from said clock to said counter to cause said counter to count, said counter generating an output signal when the limit of its count is reached, a Loran pulse generator connected to the output of said counter for generating a Loran pulse whenever an output from the counter is received, a register connected to the output of the computer for receiving digital information therefrom, and means for transferring the information stored in said register to the input of said generator to cause said generator to generate pulses having the required characteristics.

8. A system for simulating Loran navigation systems which include a plurality of Loran transmitters each with a different pulse recurrence rate from the others and covering a wide geographical area, said simulation system comprising a general-purpose digital computer, at least one Loran receiver, and apparatus coupling said receiver to said transmitter, said apparatus comprising a counter, means for connecting said counter to said computer so that the numerical output from said computer loads said counter, a pulse generator having a fixed pulse rate, means for connecting said pulse generator to said counter so that the pulse output from said pulse generator is applied to said counter and causes said counter to count, said counter generating an output signal when the limit of its count is reached so that the time between output signals from said counter is determined by the value of the word loaded into into said counter from said computer, a Loran pulse generator, means for connecting said Loran pulse generator to the output of said counter so that a Loran pulse is generated whenever an output signal occurs from said counter, a first register and a second register, means for connecting said first register to the output of said computer so that said computer loads said first register, means for connecting said second register to the output of said first register so that said first register transfers information stored therein into said second register, means for transferring information in said second register to said Loran pulse generator to determine the characteristics of the pulse generated thereby, and means connecting the output from said counter to an input of said computer to cause said computer to again transfer digital information into said counter and into said first register whenever a signal output is generated by said counter.

* * * * *